US009008611B2

(12) United States Patent
Thakur et al.

(10) Patent No.: US 9,008,611 B2
(45) Date of Patent: *Apr. 14, 2015

(54) SYSTEM AND METHOD FOR PROVIDING PREPAID BILLING FOR INSTANT MESSAGING USERS

(71) Applicant: Unwired Planet, LLC, Reno, NV (US)

(72) Inventors: Madhukar Narayan Thakur, San Jose, CA (US); Mingzhe Zhuang, Redwood City, CA (US); Francisco Jose Kattan, San Jose, CA (US)

(73) Assignee: Unwired Planet, LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/080,735

(22) Filed: Nov. 14, 2013

(65) Prior Publication Data
US 2014/0080441 A1    Mar. 20, 2014

Related U.S. Application Data

(63) Continuation of application No. 13/287,059, filed on Nov. 1, 2011, now Pat. No. 8,626,117, which is a continuation of application No. 11/510,424, filed on Aug. 24, 2006, now Pat. No. 8,073,472.

(60) Provisional application No. 60/711,715, filed on Aug. 26, 2005.

(51) Int. Cl.
| H04M 11/00 | (2006.01) |
| H04M 15/00 | (2006.01) |
| G06Q 20/10 | (2012.01) |
| H04L 12/58 | (2006.01) |
| H04W 4/26  | (2009.01) |

(52) U.S. Cl.
CPC .............. *H04M 15/88* (2013.01); *G06Q 20/10* (2013.01); *H04L 12/581* (2013.01); *H04L 51/04* (2013.01); *H04M 15/00* (2013.01); *H04M 15/85* (2013.01); *H04M 15/854* (2013.01); *H04M 15/86* (2013.01); *H04W 4/26* (2013.01); *H04M 2215/208* (2013.01)

(58) Field of Classification Search
CPC ................ H04M 15/88; H04M 15/83; H04M 2215/0116; H04M 15/772; H04M 2017/26; H04L 12/14; H04L 12/1464
USPC ............. 455/405, 406, 407, 408; 379/114.16, 379/114.2; 705/39, 52, 54, 112
See application file for complete search history.

(56) References Cited

U.S. PATENT DOCUMENTS

| 7,120,455 | B1 | 10/2006 | Chen et al. | |
| 2002/0029189 | A1* | 3/2002 | Titus et al. | 705/39 |

(Continued)

FOREIGN PATENT DOCUMENTS

| WO | 0163897 | 8/2001 |
| WO | 03019845 | 3/2003 |

*Primary Examiner* — Christopher M Brandt
*Assistant Examiner* — Joseph Dean, Jr.
(74) *Attorney, Agent, or Firm* — Sheppard, Mullin, Richter & Hampton LLP

(57) ABSTRACT

A system and method for providing prepaid billing for users of an instant messaging system. A method includes determining whether a prepaid account balance associated with an IM client request satisfies a pre-determined criteria, establishing a regular IM session if the prepaid account satisfies the criteria, and establishing a limited IM session if the prepaid account does not satisfy the criteria. The system includes a prepaid account screener operable to determine whether a prepaid account balance satisfies the criteria, establish a regular IM session if the prepaid account satisfies the criteria, and establish a limited IM session if the prepaid account does not satisfy the criteria.

23 Claims, 3 Drawing Sheets

(56) References Cited

U.S. PATENT DOCUMENTS

| | | | |
|---|---|---|---|
| 2002/0156732 A1* | 10/2002 | Odijk et al. | 705/40 |
| 2003/0073426 A1* | 4/2003 | Chan et al. | 455/406 |
| 2003/0147363 A1 | 8/2003 | Ala-Luukko | |
| 2004/0102182 A1 | 5/2004 | Reith et al. | |
| 2006/0002316 A1 | 1/2006 | Ooki | |
| 2006/0019632 A1* | 1/2006 | Cunningham et al. | 455/408 |
| 2008/0021783 A1* | 1/2008 | Varghese | 705/14 |

* cited by examiner

SYSTEM AND METHOD FOR PROVIDING PREPAID BILLING FOR INSTANT MESSAGING USERS

CROSS-REFERENCE TO RELATED APPLICATIONS

This application is a continuation of U.S. application Ser. No. 13/287,059, filed Nov. 1, 2011 and entitled "System and Method for Providing Prepaid Billing for Instant Messaging Users," which is a continuation of U.S. application Ser. No. 11/510,424, filed Aug. 24, 2006 and entitled "System and Method for Providing Prepaid Billing for Instant Messaging Users," now U.S. Pat. No. 8,073,472, which claims the benefit of U.S. provisional application Ser. No. 61/711,715, filed Aug. 26, 2005 and entitled "System and Method for Providing Prepaid Billing for Instant Messaging Users," the disclosures of which are hereby incorporated by reference herein.

BACKGROUND OF THE INVENTION

The present invention is directed generally to messaging services, and more specifically, to a system and method for providing a prepaid billing function for instant messaging (IM) users.

Millions of people around the world use data services over wire line networks, wireless networks, or both. One of the most popular types of such data services is messaging services, for example, instant messaging (IM), short message service (SMS), email, or voicemail. Payment for such messaging services may be made by a monthly fee, purchase of a set amount of network resources (e.g., minutes of use) under a contractual arrangement that commits the purchaser to a certain contract time, or another type of contractual arrangement. However, in addition to traditional subscription plans, some phone carriers offer prepaid plans. Under such a plan, users pay only for the minutes they actually use with no contractual commitment. Thus, in a typical prepaid situation, there are no contracts, call plans, or monthly bills. As the user talks or utilizes a particular messaging service, money is deducted from a prepaid account, the balance of which can be adjusted by purchasing additional credits or minutes from the carrier directly or by purchasing prepaid cards having a specified balance.

One operational issue that arises when using prepaid messaging systems and methods is that of notifying a user of a shortage of funds in their prepaid account, and controlling access to such messaging services when a shortage of funds occurs. Some prepaid instant messaging systems use out-of-band communication methods (i.e., a messaging method different from the one being utilized and that has encountered the shortage of funds), such as Short Message Service (SMS) text messages or the Wireless Application Protocol (WAP)-push function, to notify users when their prepaid account balances do not have enough credit to complete a particular messaging transaction. This generally means that the messaging service being utilized (e.g., IM) is discontinued and additional network resources are used to notify the user of the low account balance problem. In addition, when out of band communication methods are used to inform a user of a shortage of funds, the out of band message must be accessible to the user. This requires the ability to utilize the out of band messaging service (i.e., the out of band service is configured for use on the user's device and that messages from the out of band service are accessible to the user during or at the termination of the messaging service that has a shortage of funds).

What is desired is a system and method for notifying users of a prepaid instant messaging service of a shortage of funds in their account and which overcomes the disadvantages of present approaches to the problem.

BRIEF SUMMARY OF THE INVENTION

The present invention consists of a system and method for providing a prepaid billing function for an instant messaging (IM) service. An exemplary embodiment includes determining whether a prepaid account associated with an IM client or user request has a minimum balance, establishing a regular IM session if the prepaid account has the minimum balance, and establishing a limited IM session if the prepaid account does not have the minimum balance. In the limited IM session, the user may not appear as active to other uses, but may remain connected long enough to receive a low-balance warning, such as via an IM message. One aspect of the present invention is that it utilizes the same messaging service to provide a low-balance notification as the service being used for the messaging function. This reduces or eliminates important problems associated with using an out of band messaging service to notify the user, because no new network resources are utilized to deliver the notification and reception of the low balance message by the user is assured.

In another embodiment of the present invention, a system includes a prepaid account screener operable to receive an IM client request, a prepaid billing system coupled to the prepaid account screener, an IM gateway server coupled to the prepaid account screener, and a prepaid account biller coupled to the IM gateway server, the prepaid billing system, and an IM backend server.

It is an object of the present invention to provide a system and method for prepaid billing for instant messaging users or clients. By using a screening system, the invention allows implementation of a prepaid billing feature for instant messaging services. The present invention also allows for providing limited service to users whose prepaid accounts do not have a sufficient balance to cover new transactions.

It is a further object of the invention to provide an instant messaging system message to notify users of an insufficient balance, e.g., a request to recharge their account. It is an additional object of the present invention to minimize the impact on the performance and operations of existing instant messaging systems and other messaging systems, and on network resources when delivering the insufficient balance message, while avoiding or minimizing dependency on external backend servers that may be a part of the messaging system.

In addition, it is an object of the invention to be capable of utilizing and conforming with an industry standard, if desired, so that communications are consistent with the instant messaging application. The invention further provides a method of handling low balances or credits in prepaid accounts that minimizes the degradation of the user experience and that of others who communicate with the user through the instant messaging service.

The foregoing has broadly outlined certain features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The innovative features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
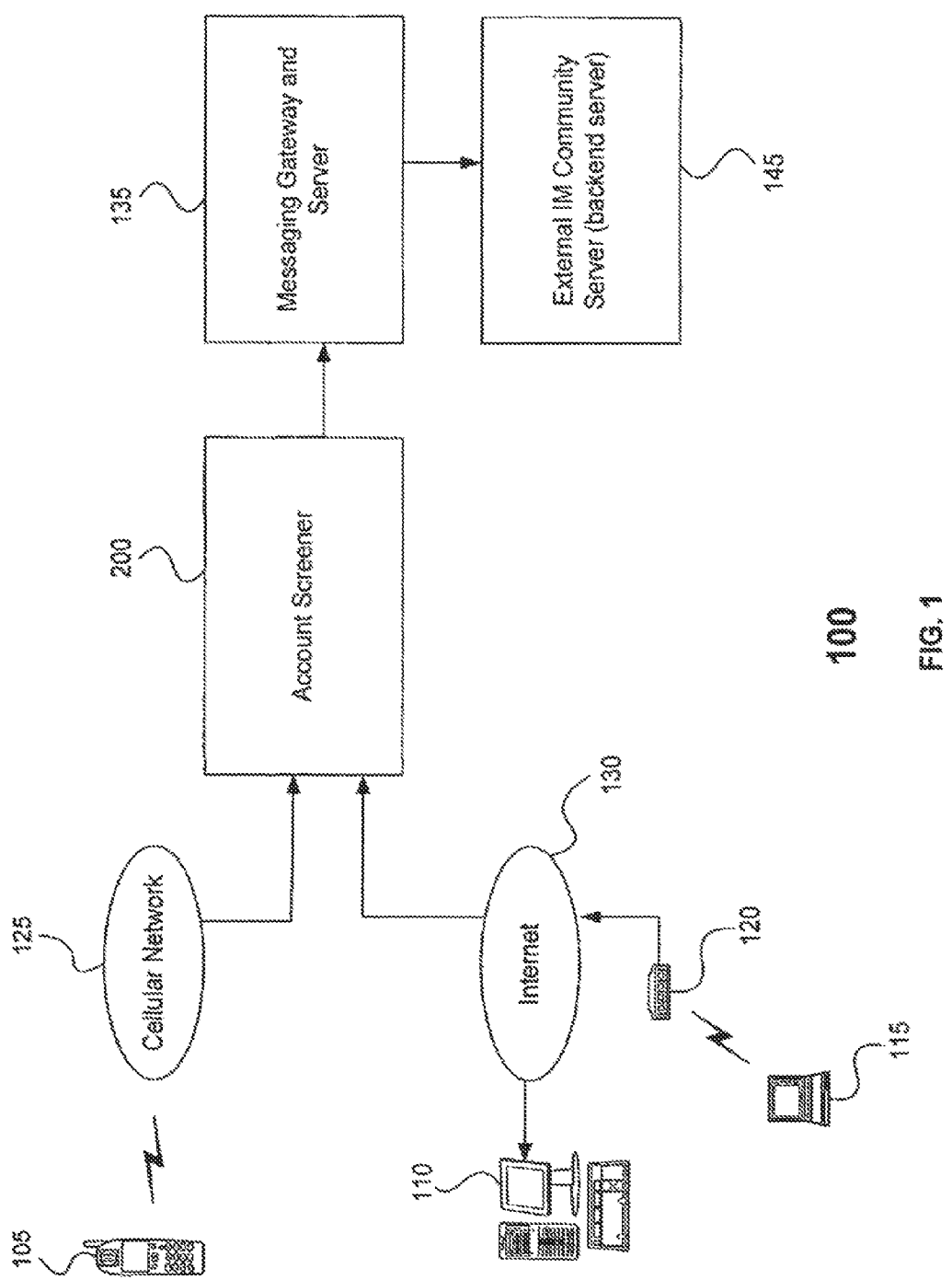
FIG. 1 is a functional block diagram of a system for providing prepaid billing for instant messaging (IM) users according to one embodiment of the present invention.

FIG. 1 is a functional block diagram of a system for providing a prepaid billing function for instant messaging (IM) users 100 according to an exemplary embodiment of the present invention. Wireless device 105 is operable to connect to wireless network 125. Wireless device 105 may be a wireless telephone, wireless modem, pager, PDA, computer, or similar device that is capable of being configured to communicate using an instant messaging system. Wireless network 130 may be, for example, a cellular telephony network complying with the Global System for Mobile communications (GSM), Digital-Advanced Mobile Phone Service (DAMPS), Interim Standard (IS)-136, IS-95, Code Division Multiple Access (CDMA) 2000, Wide-band CDMA (W-CDMA), or Universal Mobile Telecommunications Service (UMTS) standards, or other Personal Communications Services (PCS), Time Division Multiple Access (TDMA) or CDMA wireless network. The term "network" as used herein refers generally to typical infrastructure and components of a telecommunications network, such as base stations, mobile switching centers, switching and control networks, and any other related gateways, nodes or elements, including Home Location Registers (HLRs), Visitor Location Registers (VLRs), Signaling Control Points, message centers, and the like. Fixed computer 110 is coupled to Internet 130. Laptop 115 is also coupled to Internet 130 through, for example, wireless base station 120. Base station 120 may be, for example, a base station complying with the WiFi (IEEE 802.11) standard.

Prepaid account screener system 200 is coupled-to Internet 130 and wireless network 125. In one embodiment, prepaid account screener system 200 may include an HTTP prepaid account screener, SMS prepaid account screener, or another element capable of functioning in a similar manner. Messaging gateway 135 (e.g., an IM gateway) is coupled to prepaid account screener system 200 and may provide, for example, features and functions for a standardized instant messaging system (e.g., "Wireless Village," also known as the Open Mobile Alliance (OMA) Instant Messaging and Presence Services (IMPS)). Herein, standardized instant messaging system is meant to refer to a set of standard specifications for facilitating user adoption of instant messaging data services by specifying market driven mobile service enablers that ensure service interoperability across devices, geographies, service providers, operators, and networks. Note that the IM client may be client software constructed in a manner to comply with the a specification developed under such a standardized system, and may execute on a mobile terminal such as cell phone 105, or a fixed client, such as fixed computer 110. In the case of an IM messaging system, IM gateway 135 is coupled to an IM backend server 145 (labeled "External IM Community Server" in the figure). The IM backend server 145 may be, for example, an AOL® server, a Yahoo!™ server, an ICQ™ server, an MSN™ server, or other server that is capable of providing access to IM services.

In operation, prepaid account screener system 200 limits the available IM service for users with a prepaid account that does not contain a sufficient balance or credit to cover a current or new IM transaction (such as a new communication session or continuance of an existing session). In contrast with existing approaches for notifying a user of an insufficient balance, prepaid account screener system 200 uses the IM system itself to notify the users of the insufficient balance and to request that they recharge their account. In addition, prepaid account screener system 200 avoids or minimizes the impact and dependency on external backend servers when performing the notification function. In one embodiment, account screener system 200 may handle prepaid as well as "post paid" users (i.e., those users who will be billed for messaging services after use of the service). For example, screener system 200 may detect that a user is of the postpaid variety and inform IM gateway 135 accordingly. This may be achieved, for example, by sending traffic to a different port of server 135, adding an indication to the header of IM traffic packets, or sending traffic to a different IM gateway server (not shown). It will be understood by a person of ordinary skill in the art that system 100 may utilize the same set of servers for both prepaid and postpaid users. Prepaid account screener system 200 and its operation are shown in more detail in FIG. 2.

Figure 2:
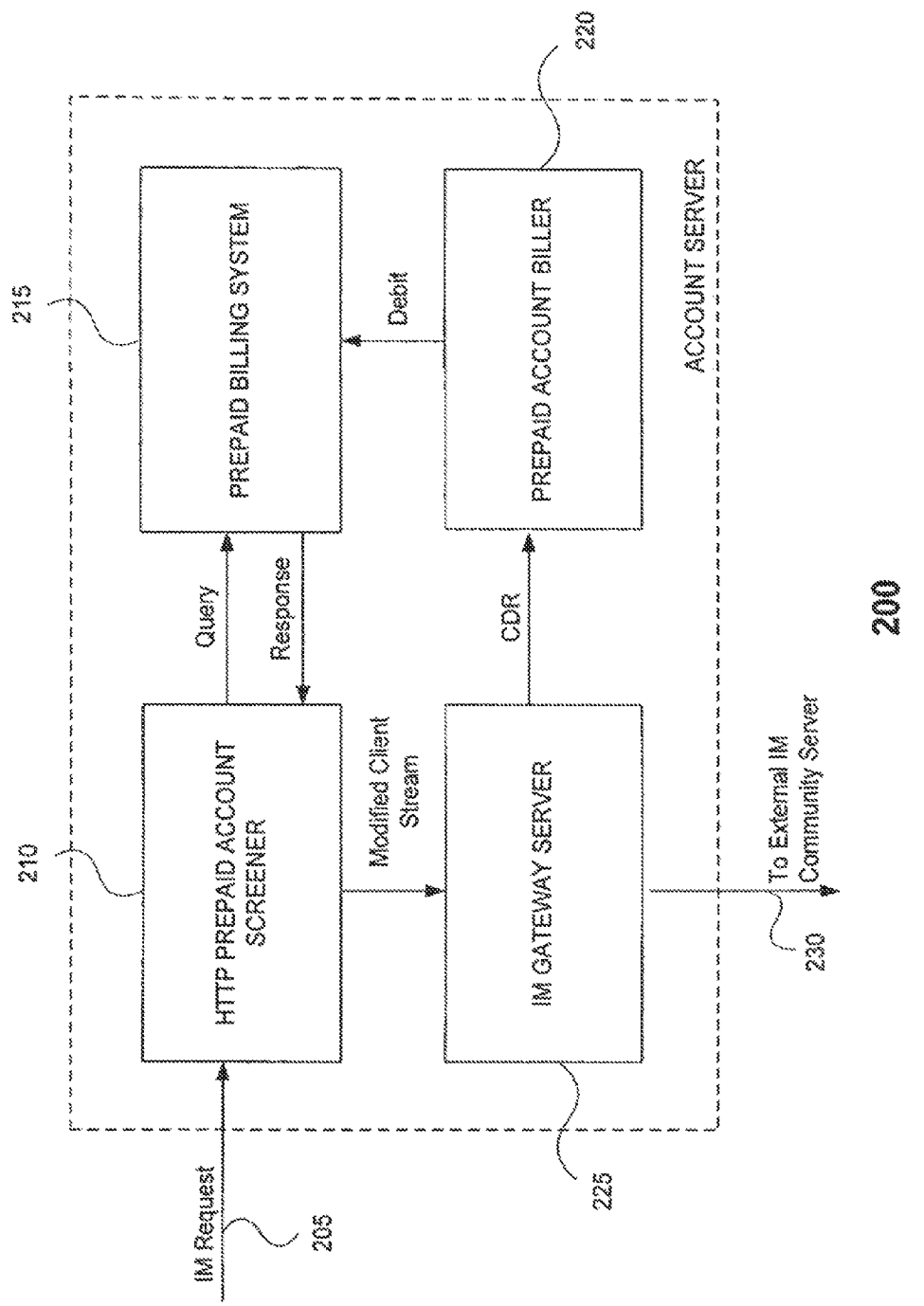
FIG. 2 is a functional block diagram of a prepaid account screener according to one embodiment of the present invention.

FIG. 2 is a functional block diagram of prepaid account screener system 200 according to an exemplary embodiment of the present invention. In operation, IM request 205, originating from an external network, such as a cellular system or the Internet, arrives at prepaid account screener module 210 in prepaid account screener system 200. Prepaid account screener module 210 queries prepaid billing system 215 and receives a response in order to determine whether the user's account has a sufficient balance or credit to cover the current IM request or transaction. If the prepaid account has a sufficient balance or credit to cover the transaction, livM gateway server 225 forwards the request to IM backend server 230 and sends a call data record (CDR) to prepaid account biller 220. Prepaid account biller 220 then debits the prepaid account in prepaid billing system 215.

If the prepaid account associated with the user does not have a sufficient balance or credit for the requested transaction, a limited IM session may be established in order to send an insufficient balance notification and/or account replenishment message to the user. During the limited IM session, certain features of the messaging system normally accessible to the user may be curtailed or eliminated, e.g., the user may have no access to his buddy list or presence data, or may be unable to send or receive IM messages. In addition, the user may be hidden from the messaging system community, so that other users do not see the low-balance user (or may see the low-balance user as being offline) on their own buddy lists. Further, during the limited JM session, prepaid account screener module 210 may transmit a modified IM message that serves as a low account balance alert to IM gateway server 225. Upon determining or being notified that the user's prepaid account has an insufficient balance or credit, IM gateway server 225 may automatically reply to the user with an error status code and not forward the client request or other IM message to the external backend server (element 145 of FIG. 1, or element 230 of FIG. 2).

In addition to replying with an error status, IM gateway server 225 may send a system message to the client to inform the user of the low account balance and the need to recharge the account. In an alternative embodiment, the system message may include a uniform resource locator (LJRL) or other form of data location identifier that corresponds to a recharge page or site provided by the operator, and through which the low-balance user may replenish his/her account. After sending the system IM message, the IM gateway server 225 typically will terminate the current session for the user with a low-balance account.

It will be understood that the term "sufficient balance or credit" as used in this disclosure is intended to represent any monetary or dollar amount set by the messaging service provider. In one embodiment, it represents a threshold value that defines a level at or below which messaging services will not be provided. The amount may be a zero balance, a positive balance, or a negative balance. The sufficient balance or credit amount may represent an account balance required before charging for a requested IM service, or an actual or estimated account balance that would exist if the requested IM service were performed and charged to the user's account.

If the user recharges the prepaid account to an amount above the sufficient balance or credit amount, the prepaid user may then use the messaging service. Further, in one embodiment, when a low-balance user (i.e., one whose account has an insufficient balance or credit) sends another login request before recharging the account, IM gateway 225 establishes a new limited messaging session with the client device (e.g., a cell phone, PC, etc.) for the purpose of delivering an insufficient or low-balance message as described above, and then terminates the limited session.

Prepaid account biller (i.e., billing module) 220 may be a program that handles post-processing of CDR records generated by IM gateway server 225 and posts charges to the accounts for billable records. Because charges may not be applied synchronously during the transactions that form the basis for the charges, a prepaid account's credit balance may not always reflect usage in real-time. As a result of the delay between the time a charge is incurred and the time the charge is posted to the account, some cases may result in "overuse," which means that the system may allow a prepaid message or session to occur without recognizing that the actual account balance is, or will become, too low. Therefore, any such delays preferably should be kept to a minimum, so that overuse is limited to a small number of transactions.

In one embodiment, the account screener system or module may flag a client request with a special token when a low balance account is detected. For example, in the case where the communication protocol is HTTP based, the screener may insert a special HTTP header to differentiate between regular and low balance modes of operation.

In a low-balance-alert state, a client request within a previously established session may be replied to with an error code. However, in standard IM protocols there is no specific error code to indicate that an account has an insufficient balance. Therefore the user most likely will not understand the cause of the error, let alone receive further instructions regarding how to recharge the account.

It is also generally possible to provide a brief textual error message in the above mentioned error code reply. However, it is up to the client IM application to decide how to render the received error message. Note that some IM clients will simply ignore the error message in the reply.

Therefore, it is important that in addition to the error status reply, the IM server sends an IM message to the client to inform the user of the low account balance state. Because the client is an IM application, the user will always receive such an IM message (in contrast to the situation in which the low account balance message is provided by an out of band messaging system). The system IM message should tell the user what happened and how to proceed in order to reactivate or otherwise adjust the account.

If a prepaid account reaches a low-balance state during a normal session, IM gateway server 225 may terminate the session after delivering the system alert. In order to terminate the session, IM gateway server 225 may send a Logout-Request to external backend server 145 and also send a server-initiated Disconnect to the client. By terminating the current user's session, new server requests, such as NewMessage or PresenceNotification, may be prevented from placing a burden on the relevant servers or other messaging infrastructure. The Logout-Request to the external community service is queued as a regular outstanding client request. This transaction may be completed when a Disconnect command with matching transaction-ID is returned. If the Disconnect command is not returned within a predetermined time period, the queued request is eventually timed out, as with other client requests. Note that after recharging the account, the prepaid user can re-login to the messaging service.

Note that when a messaging client associated with an insufficient account balance user submits a Login-Request, a system message may still be sent back. Normally, if an account's prepaid balance is low, a system would simply deny the login as if the authentication process had failed. However, because the inventive system is designed to use the in-band IM system to deliver a system message to the client, the present invention's approach is to allow the client to login, but only for the purpose of delivering the system message. Once the message is sent, the client is automatically logged out. This may be accomplished as follows. First, IM gateway server 225 allows the client to establish a new messaging session. Once the user is logged in, IM gateway server 225 delivers the system message as described above and then disconnects the limited session. Note that this limited session need not involve external community server(s) 145 and need not authenticate the user. In one embodiment, a low balance, limited session identification (ID) may follow a fixed format, such as:

<ClientIDIndex><Prefix><SessionCookie><UserID>;

where the <prefix> field is a configurable text string under the following key:

billing.prepaid.lowbalance.sessionid.prefix=OIMPPLOW.

The use of a distinct prefix may differentiate between a normal IM session that is established at external community server(s) 145 and a local, limited IM session used for delivering a low balance alert or other form of notification. Note that when terminating such a limited session, there is no need to send a Logout-Request to the IM backend server 145. Note further that some messaging clients may not process incoming messages before completing ClientCapability and Service transactions. Hence, during the setup of a limited IM session, IM gateway server 225 may complete such transactions with the client. However, in such a case the ClientCapability-Response and Service-Response should be largely static and kept relatively simple, while still providing sufficient information for the client session to be validated. This is done to permit completion of the transaction while utilizing minimal system resources.

In one embodiment, a session is considered a limited IM session if client transactions arrive on a low-balance port. This can occur either in a newly established session or within an existing IM session. Further, during a limited IM session, the types of valid client requests may be limited to, for example, the three login related transactions (Login, Client-Capability, Service) and the Polling-Request and Logout-Request. LogoutRequests receive a locally generated Disconnect command. Polling-Request are discussed in more detail below. In order to conserve system resources, other client requests may be replied to locally with a low-balance error code or other message type as described above.

Moreover, in order to make sure that the system message is displayed properly and that the user has a chance to read it, the Disconnect command may be sent after a delay, preferably set by a configuration key, such as, for example:

billing.prepaid.lowbalance.disconnect.delayms=60000.

During regular transactions, server requests are queued at an external site. However, during a limited IM session, IM gateway server 225 locally generates and sends requests to the client. This provides the benefit of reducing the burden on the messaging system infrastructure, while providing the desired notification and limited usage characteristics of the invention. This also enables the inventive system to show the low or insufficient balance user as "off-line" to interested users of the messaging service (e.g., other users on the "buddy" list). It will be understood that the IM clients may be HTTPbased, SMS, WAP, or utilize another protocol that is compatible with IM messaging methods and systems.

In one embodiment, server messages are delivered to clients as a result of a Polling process. Polling is a type of mechanism used in some protocols to enable a client to receive messages. It is typically used in so-called "asymmetric" communication protocols such as HTTP, because the client can send a request to a server any time it wants, but the server can only reply when there is a client request. Therefore in order for the user to receive IM messages in a timely fashion the mobile client "polls" the server regularly at a certain interval (e.g., every 5 seconds). When the server receives a polling request, the server can deliver IM messages to that client. In the context of the present invention, the server may also deliver the "low balance" system message as a reply to a polling request.

A Polling-Request can arrive at any IM gateway server and is not restricted to the IM gateway server, such as server 225 that sent the committed information rate (CIR). When a Polling-Request comes to a server on the low-balance port, the system returns either the system message indicating an insufficient balance or the Disconnect command. In one embodiment, the system keeps some minimum level of state information about each local session in IM gateway server 225 in order to determine which message to send back. For example, the server should keep information such as if the system message has been delivered and delivery has been confirmed. Only after the delivery of the system message is confirmed can the server proceed to disconnect the client session.

For example, according to one possible IM specification (that associated with Wireless Village), a NewMessage primitive requires both RecipientJD and SenderID to be specified. SenderID may be obtained from the value specified for the billing.prepaid.lowbalance.sysalert.sender key. However, IM gateway server 225 may not know the RecipientID when it attempts to generate the NewMessage primitive to deliver the system message. Thus, in one embodiment, IM gateway server 225 may store UserID during LoginRequest in the SessionID, with that information eventually being used as RecipientID. For example, the new SessionID may be:

SessionID=<ClientID Index><Prefix><SessionCookie><UserID>;

where ClientIDIndex is required to fetch client specific error code(s) and messages, SessionCookie sends CIR to the client, and UserID is used to deliver the NewMessage primitive to the client.

Moreover, a regular SessionID does not typically store UserID information. Hence, the present invention may be configured to generate a NewMessage primitive including such UserID information when a request with a regular SessionID is received on a low balance port. For example, a modified regular SessionID may be:

SessionID=<ClientIDIndex><Prefix><Session Cookie><UserID><Actual SessionID>;

where <ActualSessionID> is an external backend server assigned SessionID.

Figure 3:
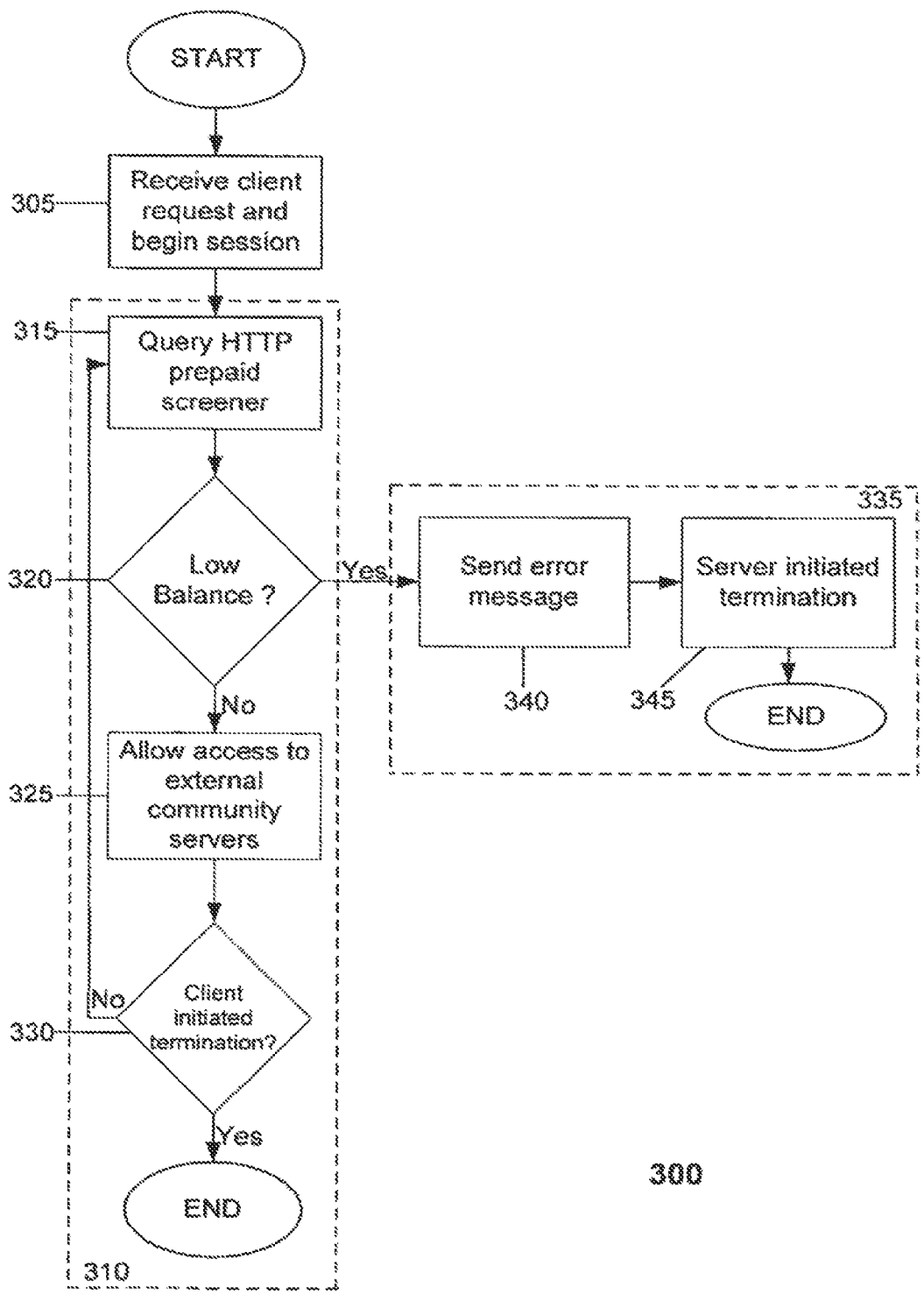
FIG. 3 is a flowchart of a method for providing prepaid billing for IM users according to one embodiment the present invention.

FIG. 3 is a flowchart of a method for providing prepaid billing for IM users 300 according to an exemplary embodiment of the present invention. In step 305, a client request is received and messaging session 310 begins. In step 315, prepaid account screener module 210 queries prepaid billing system 215 and, in step 320, determines whether the prepaid account has a sufficient balance. If the account has the minimum balance necessary for completing the request (or satisfies other criteria set by the operator of the system), method 300 allows access to external backend servers 145 in step 325 until the client initiates termination in step 330 or the prepaid account balance drops below such minimum balance (as determined by steps 315 and 320). In one embodiment, the minimum balance is a predetermined level or dollar amount necessary to establish or maintain a regular IM session. If the method 300 detects an insufficient balance in step 320, a limited IM session 335 is initiated so that an error message can be sent to the client in step 340, followed by a server initiated termination as in step 345.

Note that although the inventive system and methods have been described with reference to specific components and processes, the inventive system and methods are not limited to those described. The inventive system and methods may, for example, be implemented by other suitable components and/or processes that are capable of being configured to execute or otherwise carry out the desired functions. For example, various of the components described may be implemented as separate functional elements that communicate and otherwise exchange data using an appropriate communications channel, or may be implemented as parts of a larger co-located server.

A system and method for providing prepaid instant messaging services has been described. The inventive system provides a low or insufficient balance notification to a user in a manner that increases user recognition of the problem while minimizing the use of network resources. The low or insufficient balance notification is provided within the context of the same messaging system as the one associated with the low or insufficient balance account. This ensures that a user will receive the notification, while minimizing the use of network resources associated with other messaging systems. By implementing the low or insufficient balance detection and notification processes as part of functional elements other than the backend servers, the present invention does not require modifications to those servers or related elements of the messaging system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method of providing a prepaid messaging service between a mobile device and a messaging server, the prepaid messaging service having a plurality of features, the method comprising:
responsive to a request from the mobile device for the prepaid messaging service, determining, at a server system having memory and one or more processors, that a prepaid account associated with a user of the mobile device does not satisfy one or more pre-determined financial criteria, wherein there is a communication channel between the server system and the mobile device; and
responsive to the determining:
(i) sending an account recharge notification to the mobile device via the communication channel, wherein the account recharge notification includes a link configured to allow the prepaid account to be recharged such that the one or more pre-determined financial criteria are satisfied; and
(ii) establishing a limited messaging service between the mobile device and the messaging server, wherein establishing the limited messaging service comprises allowing access by the mobile device to a reduced set of the plurality of features of the prepaid messaging service, the reduced set including at least one feature but fewer than all features of the plurality of features of the prepaid messaging service.

2. The computer-implemented method of claim 1, wherein the pre-determined financial criteria include a threshold value, and the pre-determined financial criteria are not satisfied if a balance of the prepaid account has a value less than the threshold value.

3. The computer-implemented method of claim 1, further comprising:
in connection with sending the account recharge notification to the mobile device, sending a message containing an error code to the mobile device via the communication channel.

4. The computer-implemented method of claim 1, wherein the determining step is performed in response to a request from the mobile device to start a new instance of the prepaid messaging service for the mobile device.

5. The computer-implemented method of claim 1, wherein blocking exchange of data further includes blocking transmission of a message from the mobile device to the messaging server, wherein the message is directed to a user of another mobile device that is using the prepaid messaging service.

6. The computer-implemented method of claim 1, further comprising:
sending a termination request, by the server system, to the messaging server, wherein the termination request includes one or more of a user identifier associated with the user of the mobile device and a service identifier associated with a preexisting instance of the prepaid messaging service used by the mobile device before the establishment of the limited messaging service.

7. The computer-implemented method of claim 1, wherein the mobile device is one selected from a group consisting of a wireless telephone, a laptop computer, and a personal digital assistant.

8. The computer-implemented method of claim 1, wherein the communication channel is a wireless communication channel.

9. The computer-implemented method of claim 1, wherein the link provides the user with access to an account replenishment function through which the user can replenish the prepaid account.

10. The computer-implemented method of claim 9, wherein the link comprises a uniform resource identifier.

11. The computer-implemented method of claim 1, further comprising establishing the limited messaging service responsive to a second request from the mobile device for the prepaid messaging service.

12. A server system, comprising:
one or more processors; and
memory for storing one or more programs, wherein the one or more programs, when executed by the one or more processors, cause the server system to perform one or more instructions including:
instructions for determining, responsive to a request from a mobile device for a prepaid messaging service having a plurality of features, that a prepaid account associated with a user of the mobile device does not satisfy one or more pre-determined financial criteria, wherein there is a communication channel between the server system and the mobile device; and
instructions for, responsive to the determining:
(i) sending an account recharge notification to the mobile device via the communication channel, wherein the account recharge notification includes a link configured to allow the prepaid account to be recharged such that the one or more pre-determined financial criteria are satisfied; and
(ii) establishing a limited messaging service between the mobile device and the messaging server, wherein establishing the limited messaging service comprises allowing access by the mobile device to a reduced set of the plurality of features of the prepaid messaging service, the reduced set including at least one feature but fewer than all features of the plurality of features of the prepaid messaging service.

13. The server system of claim 12, wherein the instructions for determining are performed in response to a request from the mobile device to start a new instance of the prepaid messaging service for the mobile device.

14. The server system of claim 12, wherein the instructions for determining are performed while the mobile device is using an existing instance of the prepaid messaging service to exchange messages with the messaging server.

15. The server system of claim 12, wherein the communication channel is a wireless communication channel.

16. The server system of claim 12, wherein the link provides the user with access to an account replenishment function through which the user can replenish the prepaid account.

17. A non-transitory computer readable medium having stored therein a computer program product, the computer program product comprising one or more instructions executable by a server system, the one or more instructions including:

instructions for determining, responsive to a request from a mobile device for a prepaid messaging service having a plurality of features, that a prepaid account associated with a user of the mobile device does not satisfy one or more pre-determined financial criteria, wherein there is a communication channel between the server system and the mobile device; and instructions for, responsive to the determining:

(i) sending an account recharge notification to the mobile device via the communication channel, wherein the account recharge notification includes a link configured to allow the prepaid account to be recharged such that the one or more pre-determined financial criteria are satisfied; and (ii) establishing a limited messaging service between the mobile device and the messaging server, wherein establishing the limited messaging service comprises allowing access by the mobile device to a reduced set of the plurality of features of the prepaid messaging service, the reduced set including at least one feature but fewer than all features of the plurality of features of the prepaid messaging service.

18. The non-transitory computer readable medium of claim 17, wherein the instructions for determining further comprise instructions performed in response to a request from the mobile device to start a new instance of the prepaid messaging service for the mobile device.

19. The non-transitory computer readable medium of claim 17, wherein the instructions for determining further comprise instructions performed while the mobile device is using an existing instance of the prepaid messaging service to exchange messages with the messaging server.

20. The non-transitory computer readable medium of claim 17, wherein the communication channel is a wireless communication channel.

21. The non-transitory computer readable medium of claim 17, wherein the link provides the user with access to an account replenishment function through which the user can replenish the prepaid account.

22. A computer-implemented method, comprising:

receiving from a mobile device a request for a prepaid messaging service, the prepaid messaging service having a plurality of features;

determining, at a server system coupled via a communication channel to the mobile device, whether a prepaid account associated with a user of the mobile device satisfies a service authorization condition; and when the server system determines that the service authorization condition is not satisfied, then:

(i) sending an account recharge notification via the communication channel to the mobile device, the account recharge notification including a link configured to enable the prepaid account to be recharged; and (ii) establishing a limited messaging service between the mobile device and a messaging server until a financial condition is satisfied, the limited messaging service allowing access by the mobile device to a reduced set of the plurality of features of the prepaid messaging service, the reduced set including at least one feature but fewer than all features of the prepaid messaging service.

23. A computer-implemented method of providing a prepaid messaging service between a mobile device and a messaging server, the method comprising:

responsive to a request from the mobile device for the prepaid messaging service, determining, at a server system having memory and one or more processors, that a prepaid account associated with a user of the mobile device does not satisfy one or more pre-determined financial criteria, wherein there is a communication channel between the server system and the mobile device;

responsive to the determining:

(i) sending an account recharge notification to the mobile device via the communication channel, wherein the account recharge notification includes a link configured to allow the prepaid account to be recharged such that the one or more pre-determined financial criteria are satisfied; and (ii) establishing a limited messaging service between the mobile device and the messaging server, wherein establishing the limited messaging service comprises at least partially blocking the exchange of data between the mobile device and the messaging server; and sending a termination request, by the server system, to the messaging server, wherein the termination request includes one or more of a user identifier associated with the user of the mobile device and a service identifier associated with a preexisting instance of the prepaid messaging service used by the mobile device before the establishment of the limited messaging service.

* * * * *